(12) United States Patent
Gerhardinger et al.

(10) Patent No.: US 7,039,304 B2
(45) Date of Patent: May 2, 2006

(54) METHOD AND APPARATUS FOR A CLOTH HEATER

(75) Inventors: Peter F. Gerhardinger, Maumee, OH (US); Dillon R. Ashton, Luckey, OH (US)

(73) Assignee: Engineered Glass Products LLC, Chicago, IL (US)

( * ) Notice: Subject to any disclaimer, the term of this patent is extended or adjusted under 35 U.S.C. 154(b) by 0 days.

(21) Appl. No.: 10/936,848

(22) Filed: Sep. 9, 2004

(65) Prior Publication Data

US 2006/0051079 A1    Mar. 9, 2006

(51) Int. Cl.
*H05B 3/20* (2006.01)

(52) U.S. Cl. ............... 392/435; 219/543; 219/544; 392/430

(58) Field of Classification Search ............... None
See application file for complete search history.

(56) References Cited

U.S. PATENT DOCUMENTS

| | | | | |
|---|---|---|---|---|
| 3,244,858 A | * | 4/1966 | Thorpe, Jr. ............... | 392/435 |
| 3,626,152 A | * | 12/1971 | Governale et al. .......... | 392/416 |
| 4,052,588 A | * | 10/1977 | Nakamura et al. .......... | 392/433 |
| D246,985 S | | 1/1978 | Popma et al. | |
| 4,117,309 A | | 9/1978 | Cayley | |
| 4,203,198 A | * | 5/1980 | Hackett et al. ............... | 29/611 |
| D258,527 S | | 3/1981 | Souhan et al. | |
| 4,440,822 A | | 4/1984 | Gordon | |
| 4,591,701 A | * | 5/1986 | Tokumaru ................... | 219/543 |
| RE32,616 E | | 3/1988 | Graham | |
| D298,771 S | | 11/1988 | DeMars | |
| D302,460 S | | 7/1989 | Gibson | |
| 4,875,592 A | | 10/1989 | Waller | |
| 4,927,995 A | * | 5/1990 | Lovett et al. ................ | 219/385 |
| D324,620 S | | 3/1992 | Chalot | |
| D338,794 S | | 8/1993 | Wilsker | |
| 5,548,100 A | | 8/1996 | Miller | |
| 5,569,403 A | | 10/1996 | Swanson et al. | |
| 5,642,462 A | | 6/1997 | Huff | |
| RE35,834 E | | 7/1998 | Miller | |
| 6,005,227 A | | 12/1999 | Pappas | |
| 6,080,974 A | * | 6/2000 | Ambrosiano ................. | 219/544 |
| 6,153,862 A | * | 11/2000 | Job ............................ | 219/521 |
| 6,917,753 B1 | * | 7/2005 | Cooper ....................... | 392/363 |

FOREIGN PATENT DOCUMENTS

| | | |
|---|---|---|
| DE | 41 36 134 A1 | 5/1993 |
| EP | 1 030 130 A1 | 8/2000 |
| GB | 2 248 160 A | 3/1992 |
| WO | WO 96/27271 A1 | 9/1996 |

* cited by examiner

*Primary Examiner*—Thor S. Campbell
(74) *Attorney, Agent, or Firm*—Marshall & Melhorn LLC

(57) ABSTRACT

A cloth heater and method for using the heater are provided. The heater utilizes a horizontally disposed surface, a heated glass panel, and support members. The horizontally disposed surface may comprise the top edge or surface of the heated glass panel, or a surface on a separate rack that is above and vertically inline with the top edge of the heated glass panel. The heated glass panel also has two opposing major surfaces. The support members physically support the heated glass panel and have electrical leads that communicate electrical power to the heated glass panel, thus heating the heated glass panel. When a cloth is placed across the horizontally disposed surface, the horizontally disposed surface supports the cloth, and the cloth makes contact with the two opposing major surfaces of the heated glass panel, thus heating the cloth at both opposing major surfaces.

40 Claims, 6 Drawing Sheets

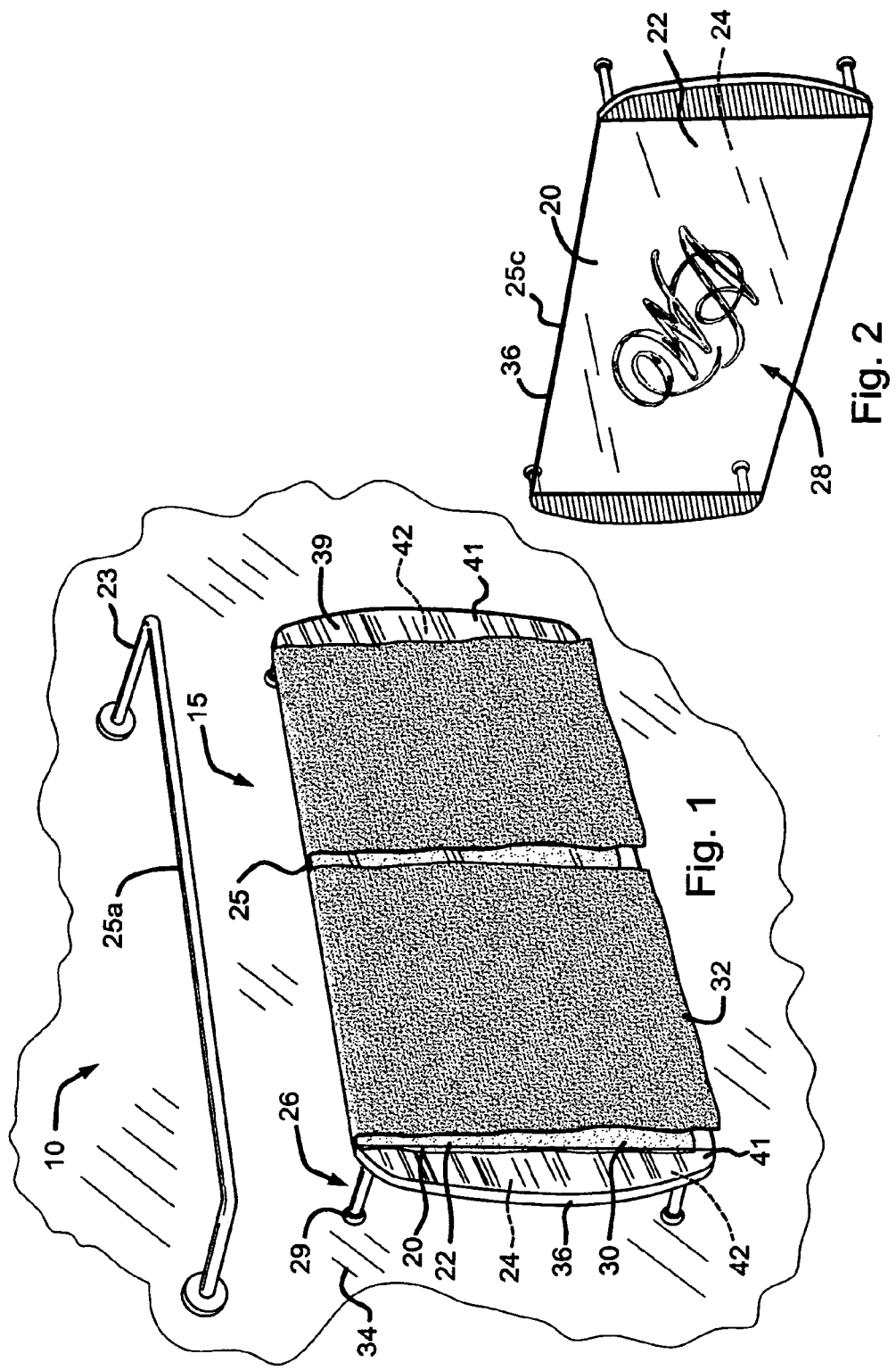

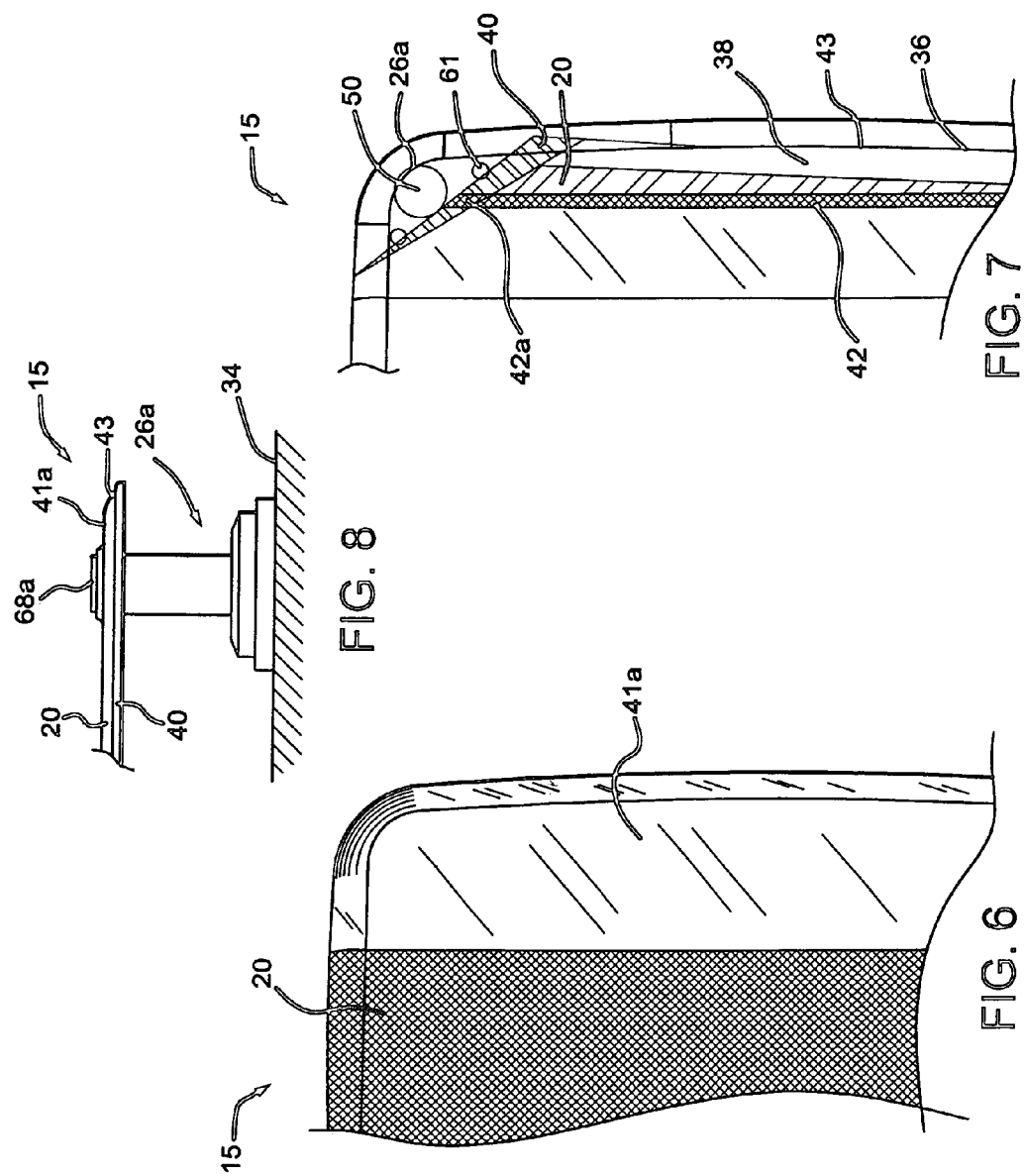

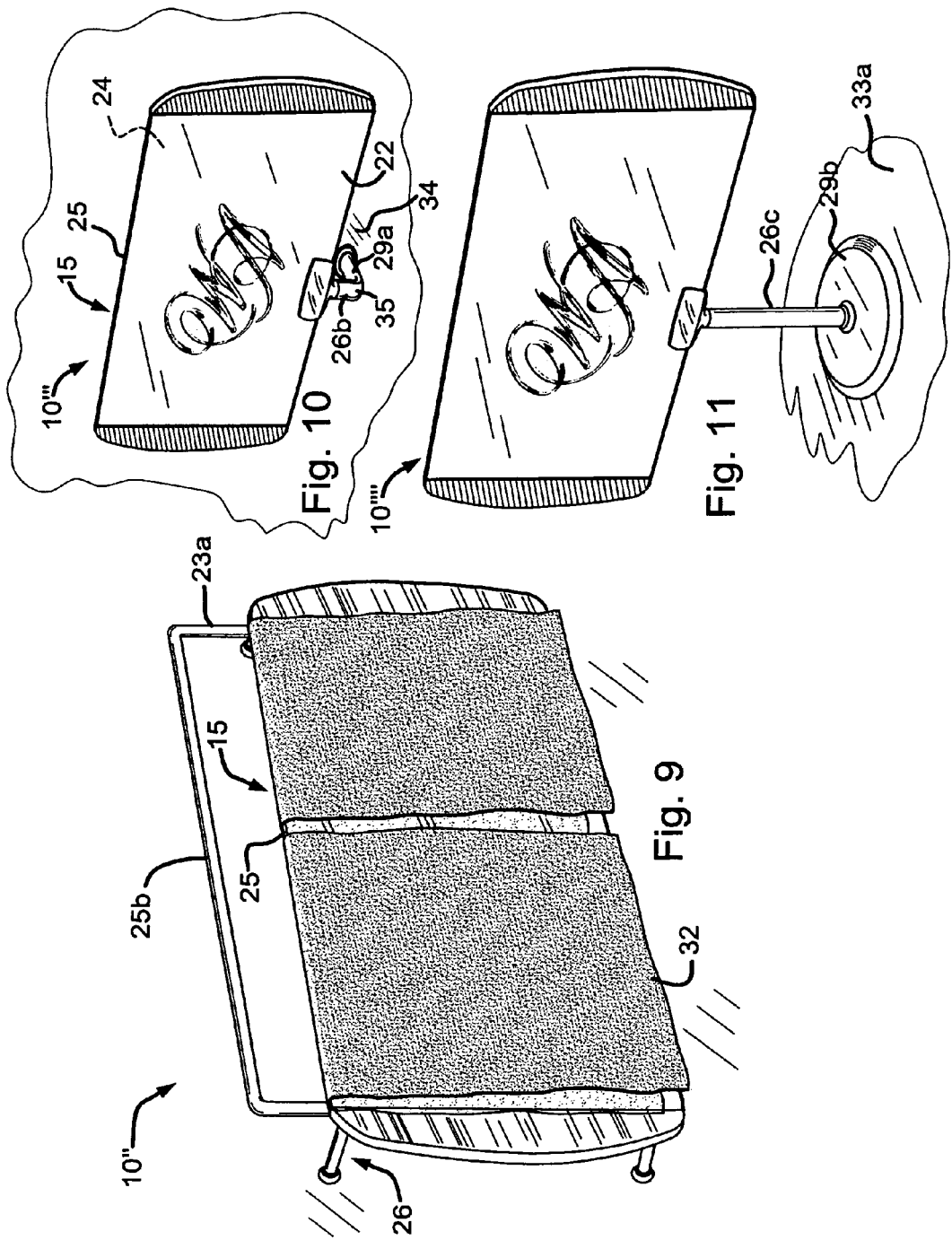

METHOD AND APPARATUS FOR A CLOTH HEATER

BACKGROUND OF THE INVENTION

The present invention generally relates to a cloth heater and, more particularly, to a method and apparatus utilizing a heated panel for heating a cloth.

BACKGROUND OF THE INVENTION

In the past, hotels and motels have provided their customers with warm towels after, for example, showers or baths. For at least this purpose, hotels and motels have installed towel warmers for their customers. Now residences are being equipped with towel warmers, since residents also enjoy warmed towels.

Over the years, towel warming devices have been developed utilizing a variety of different warming techniques. For example, U.S. Pat. No. 4,117,309 to Cayley teaches an electric towel warmer having a conventional electrical heating element that is M-shaped and mounted to a frame within a housing. The conventional heating element radiates heat to an aluminum cover plate that has holes therethrough. When a towel is placed within Cayley's housing and over the aluminum plate, the conventional heating element provides heat through the holes in the cover plate to heat the towel.

In another example, U.S. Pat. No. 5,548,100 to Miller provides an article warmer having a conventional electrical coil heater that is mounted to a base having a reservoir, which contains a fluid. The fluid, such as oil, is heated by the conventional electrical coil heater and pumped through a hollow frame of vertical risers that are also mounted to the base. When a towel is placed inside of an enclosure that covers the hollow frame, and onto the hollow frame, heat is conveyed to the towel to heat the towel.

Further, U.S. Pat. No. 5,642,462 to Huff teaches a fabric article drying rack comprising an elongated tube having an interior chamber, which houses conventional electrical heating coils that heat the air within the interior chamber, and a fan that expels the heated air outwardly through a plurality of slots. The warm air exits the slots and flows over those parts of fabric articles that are exposed below the holes, thus heating the fabric by convection.

Also, European Patent EP 1 030 130 A1 to Jacquemin et al. provides a glass towel drying radiator that is hung on a wall. Jacquemin's radiator comprises a tempered glass front panel that radiates heat forward toward portions of towels that are hung on towel racks, which protrude from the front panel in the forward direction. Since cloth is not a good conductor of heat, only those portions of the towels that are in the direct line of irradiation from the glass are heated, thus most parts of the towels go unheated.

Although the above-mentioned cloth heaters do provide means to heat cloths, the heating means utilized are indirect and inefficient, may be somewhat complicated to use, in some cases require an enclosure, may require continuous high voltage, require much time to get the cloth to a heated condition, do not provide adequate temperature controls, do not heat large portions of a cloth, are costly, require a large footprint, pose a potential for burns and fire, require pumps and fluids that are noisy and potentially dangerous, require exposed electrical cords that are unsightly and may be dangerous, and whose overall appearance may not be aesthetically pleasing. As a result, there is a need to more directly, safely, efficiently, easily, completely, economically, and aesthetically provide heated towels.

Thus, those skilled in the art continue to seek a solution to the problem of how to provide a better cloth heater, and a method for heating cloth.

SUMMARY OF THE INVENTION

The present invention is directed to a method and an apparatus to heat cloth that utilizes at least one horizontally disposed surface or edge, at least one heated panel that has at least two opposing major surfaces, and at least one support member. The support member physically supports the heated panel, and there may be electrical leads disposed within, on, or near to the support member that communicate electrical power to the heated panel, thus heating the heated panel. When a cloth is placed across the horizontally disposed surface of the cloth heater, the horizontally disposed surface supports the cloth and the cloth is draped proximate the two opposing major surfaces of the heated panel, thus heating the cloth at both opposing major surfaces of the heated panel.

Further advantages of the present invention will be apparent from the following description and appended claims, reference being made to the accompanying drawings forming a part of a specification, wherein like reference characters designate corresponding parts of several views.

BRIEF DESCRIPTION OF THE DRAWINGS

FIG. 1 depicts a three dimensional frontal view of a preferred embodiment of the present invention;

FIG. 2 depicts a three dimensional frontal view of an alternative embodiment to that of the invention of FIG. 1;

FIG. 6 depicts a front corner view of a third alternative embodiment of the present invention;

FIG. 7 depicts a cut-away front corner view of the embodiment of FIG. 6;

FIG. 8 depicts a top view of the embodiment of FIG. 6;

FIG. 9 depicts a three dimensional frontal view of a third preferred embodiment of FIG. 1;

FIG. 10 depicts a three dimensional frontal view of a fourth preferred embodiment of FIG. 1; and FIG. 11 depicts a three dimensional frontal view of an alternative embodiment of FIG. 5.

DETAILED DESCRIPTION OF THE PREFERRED EMBODIMENTS

Figure 3:
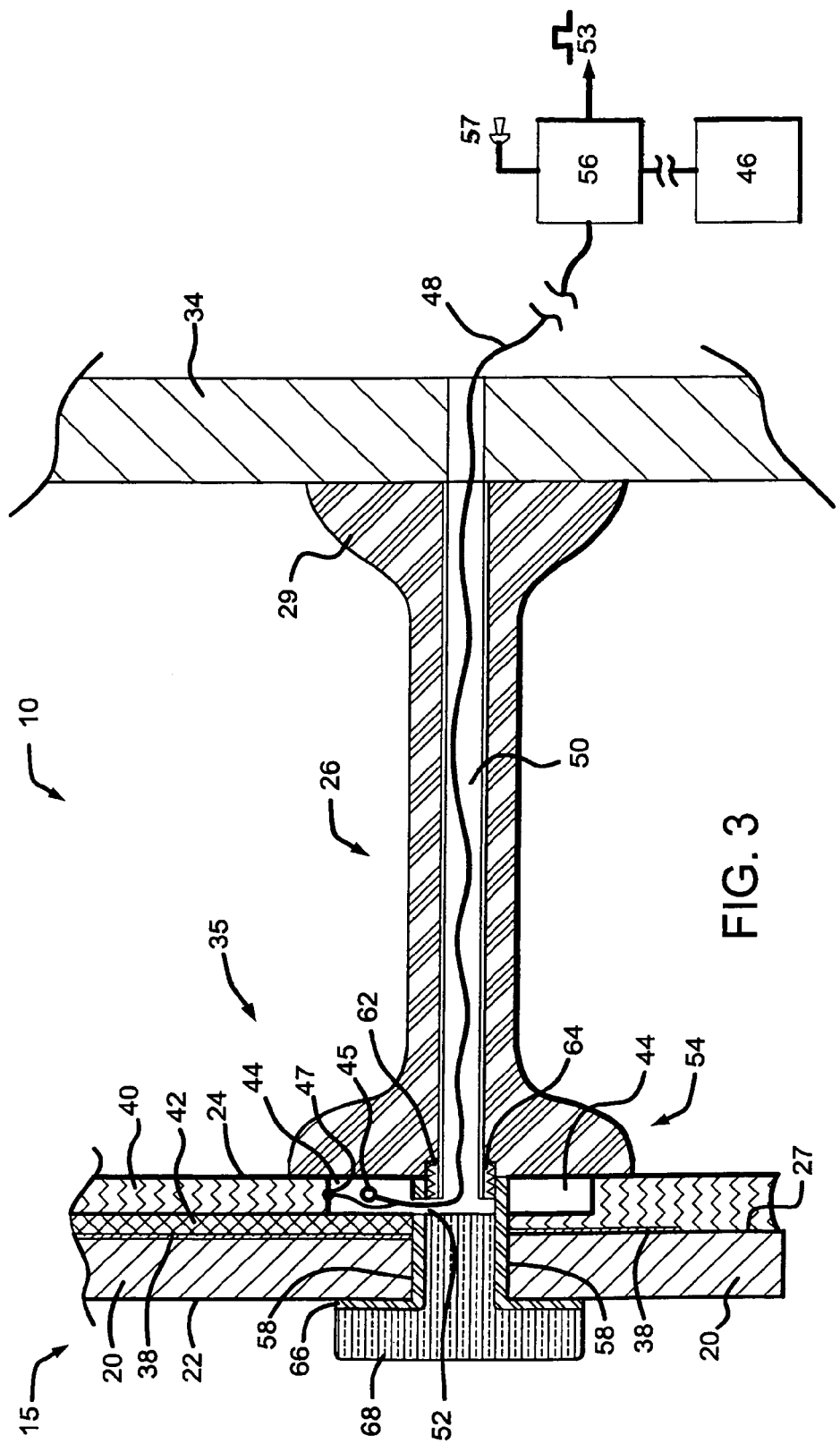
FIG. 3 depicts a portion of a sectional side view of the preferred embodiment of FIG. 1.

Referring to FIG. 1, a three dimensional front view of a preferred embodiment of a cloth heater 10 of the present invention is shown as having at least one heated panel 15 that has at least a first sheet of dielectric material 20. The panel 15 is depicted as substantially rectangular with rounded-edges, however, any geometric shape having any number of sides, including oval, circular, and heart shaped designs, are well within the spirit and scope of the present invention.

The first sheet 20 has a first major surface 22, and the panel 15 has an opposing second major surface 24. The first major surface 22 and the second major surface 24 are depicted as substantially planar, however, the cloth heater 10 can also have non-planar surfaces 22, 24. In this preferred embodiment, four support members 26 are utilized to mount the heated panel 15 to a wall 34.

As shown in FIG. 1, the support members 26 are straight and horizontally disposed. However, as FIGS. 1, 5, 10, and 11 show, horizontally, vertically, and diagonally disposed support members 26, 26a–d may be attached to or movably disposed on a ceiling 31, a floor 33, the wall 34, a countertop/floor 33a (for example, a vanity countertop, see FIG. 11), and/or other building members. Also, non-straight (for example, L-shaped 26b or S-shaped, not shown) support members are within the spirit and scope of the present invention. The present invention, however, is not limited by where the support members are disposed or their shape.

By means common in the art, the support members 26, 26a–d may allow the cloth heater to tilt away from or toward the wall. For example, in the cloth heater 10''' of FIG. 10, the support member 26b could tilt away from or tilt toward the wall 34, at, for example, a pivot point 35 where the support member 26b is connected to the support member base 29. This tilting motion would allow portions of the cloth 32 (not shown in FIG. 10) to more or less make contact with the surfaces 22, 24.

Also, a base 29a of the support member 26b may be constructed to allow the heated panel 15 to move inline (i.e., "telescope"), toward and away from the wall 34, which would allow for various thicknesses of the cloth 32 to clear the wall 34. Further, the support member 26b could be built to allow the cloth heater 10''' to tilt to one end of the panel 15 or the other, which would allow a horizontally disposed surface 25 (which may be an edge) to become more or less horizontal. The support member 26b could also be constructed to "telescope" in the direction of the horizontally disposed surface and/or away from the direction of the horizontally disposed surface, which would allow the cloth 32 to physically clear the support member base 29a. These degrees of motion could be applied to all of the support member bases 29, 29a–b.

As illustrated in FIG. 1, the horizontally disposed surface 25 on the top of the heated panel 15 is shown supporting pliable cloth 32. However, it is within the spirit and scope of the instant invention that the cloth 32 could be supported by a horizontally disposed surface 25a of a rack 23. As shown, the rack 23 is separately attached to the wall 34, but it is possible for the rack 23 to be separately attached to the ceiling 31, the floor 33, the countertop/floor 33a, and/or other building members.

Further, the present invention can employ cloth racks that take various forms that are known in the art, for example, a vertically oriented rack 23a, as shown in FIG. 9, which could be attached to the support member 26, the heated panel 15, or both. In any case, the placement of the horizontally disposed surface 25, 25a, or 25b is to be vertically inline with the heated panel 15. Whichever horizontally disposed surface 25, 25a, or 25b is utilized to support the cloth 32, the cloth 32 straddles the heated panel 15, portions of the cloth 32 are proximate the opposing major surfaces 22, 24, and the cloth 32 makes more or less contact with both of the opposing major surfaces 22, 24, thus heating a significant portion of the total surface area of the cloth 32, when compared to other cloth heaters that heat only small portions of the cloth.

Also, by utilizing means common in the art, the rack 23 could move away from and toward the wall 34 and the rack 23a could also move up and down, and both racks 23, 23a could pivot forward and backward so as to align the cloth with the heated panel 15.

Note that the displacement from the wall 34 of the heated panel 15 (and, if used, for example, of the horizontally disposed surfaces 25a–c) and the placement across the width of the heated panel 15 (and, if used, for example, of the horizontally disposed surfaces 25a–c), between the support members 26, 26a–d must be carefully considered in order for the cloth 32 to properly lie over the horizontally disposed surface 25 (or, if used, lie over the horizontally disposed surfaces 25a–c) and be heated properly by the at least two opposing major surfaces 22, 24, while not being constrained by the wall 34 or the support members 26, 26a–d.

As shown, the horizontally disposed surfaces 25, 25a–b are flat. However, the horizontally disposed surfaces 25, 25a–b may be rounded (for example, a portion of a circle or an ellipse), sharply irregular, or have other shapes, and still be considered the horizontally disposed surfaces 25, 25a–b, while remaining within the spirit and scope of the present invention. Also shown in FIG. 1 is a perimeter edge 36 that defines the first and second opposing surfaces 22, 24.

In an alternative embodiment of the invention of FIG. 1, the first surface 22 and/or the second surface 24 may comprise one or more designs 28, as shown in FIG. 2. The designs 28 may be located on the first surface 22, the second surface 24, and/or between the first and second surfaces 22, 24. These designs may be attained by virtue of painting, enameling, sandblasting, carving, etching, being electrically or electronically generated, having colorants dispersed within the dielectric sheet material, and/or other means known to those skilled in the art. Additionally, and/or alternatively, sheets of colored materials (not shown) can be located on or adjacent to the first surface 22, second surface 24, and/or therebetween.

Regarding the dielectric material chosen for the sheets, the first sheet of dielectric material 20 may be any non-conductive material, however, in a preferred embodiment the dielectric material is glass. In a most preferred embodiment, the dielectric material is optically clear, tempered, soda-lime-silica glass. Other dielectric materials, by way of example, include wood, stone, plastic, or combinations of the foregoing. However, additional dielectric materials known to those skilled in the art are well within the spirit and scope of the present invention.

The pieces of cloth 32 that are placed across the horizontally disposed surfaces 25, 25a, and are in contact with the opposing major surfaces 22, 24 of the heated panel 15, may be any pliable material made by weaving, felting, or knitting natural or synthetic fibers and filaments, such as for example, a towel, a wash cloth, a swim suit, socks, to mention a few.

FIG. 3 depicts a portion of a sectional side view of the preferred embodiment of FIG. 1, where the heated panel 15 is attached to the wall 34 with at least one support member 26. As shown in the preferred embodiment of FIG. 3, the support member 26 uses a cantilevered tube. Those skilled in the art readily understand that the support member 26 may comprise or further comprise, for example, brackets, beams, bars, adhesives, hooks, clasps, male/female couplings, nails, screws, bolts, ball joints, pivots, channels, telescoping cylinders, slotted members, tilting and pivoting mechanisms, and the like.

Figure 4:
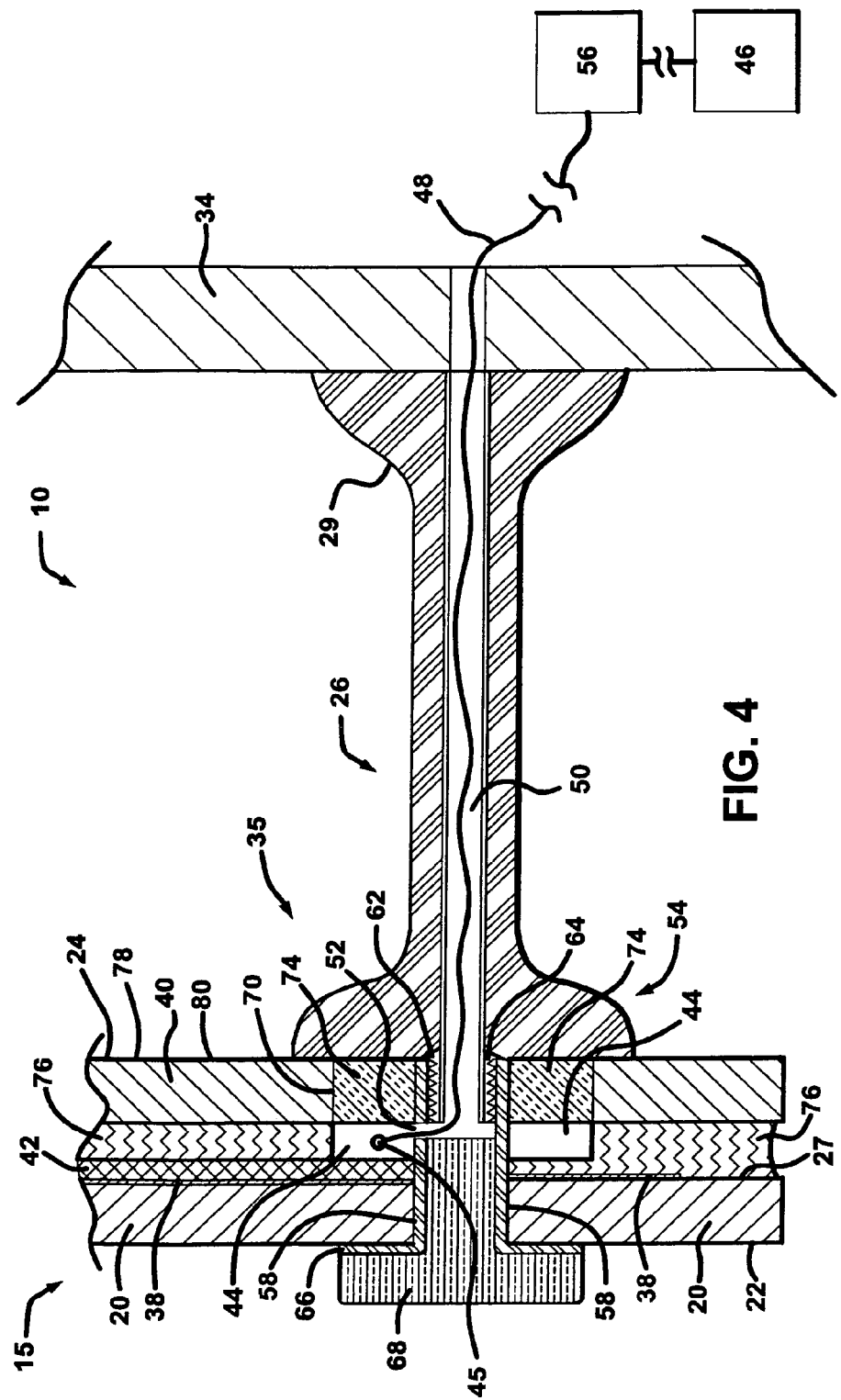
FIG. 4 depicts a portion of a sectional side view of a second preferred embodiment of FIG. 1.

Thus, it should be appreciated that the heated panel 15 and the support member 26 can be realized in many different forms than those depicted in FIGS. 3 and 4, and still remain within the spirit and scope of the present invention.

As seen in FIG. 3, an electrically conductive thin film coating 38 is located in contact with at least a portion of the first sheet of dielectric material 20. Preferably, the conductive coating 38 is located on a rear facing surface 27 (which could be the second surface 24 of the heated panel 15) of the first sheet 20, or, as shown in FIG. 3, between the first sheet 20 and a second sheet 40, where the second surface 24 would be on the rear facing exterior of the second sheet 40.

For various reasons, it may be desirable that the perimeter edge 36 and/or an area 39 adjacent to the perimeter edge 36 of the first sheet 20 (generally shown in FIG. 1) be devoid of the conductive coating 38. For example, the thin film conductive coating 38 may be deleted from the edge 36 in order to possibly prevent dielectric breakdown near the edge 36 due to, for example, moisture and/or contamination, or to improve the conditions for adhering gaskets or other attachments and items to the edge 36. Alternatively, the conductive coating 38 can be applied in such a way that there is no conductive coating 38 applied on the edge 36 or in the area 39 adjacent to the edge 36. As shown in FIG. 1, a cover 41 may cover the area 39, so that wiring, electrical and/or physical components and attachments to the conductive coating 38 and cloth heater 10 can be hidden from view.

Although not required, the electrically conductive coating 38 is preferably a transparent material that is thin. By way of example, this conductive coating 38 may be a doped metal oxide, however, other electrically conductive coatings known to those skilled in the art may also be used. Preferably, the metal oxide is tin oxide, however, other metal oxides are well within the scope and spirit of the present invention.

The metal oxide is preferably doped with fluorine, indium, or antimony, although other dopants known to those skilled in the art may be used. Alternatively, the conductive coating 38 may be a dielectric-metal-dielectric (DMD) material as known by those skilled in the art, such as, by way of example, zinc oxide, silver, zinc oxide. These coatings may be deposited by various means known in the art, for example, chemical vapor deposition (CVD) (see U.S. Patent Publication No. 2003-0127452 to Gerhardinger, which is incorporated herein by reference).

Returning to FIG. 1, the first surface 22, the second surface 24, and/or between the surfaces 22, 24 may have additional films or layers disposed thereon. As an example, a color suppression layer 30 may be disposed on any of the surfaces of the first dielectric sheet 20 or the second dielectric sheet 40 (see FIGS. 3 and 4) to reduce, or prevent, the appearance of iridescent colors. Color suppression layers are well known to those skilled in the art and comprise one or more coatings of varying thickness having at least one refractive index sufficient to reduce or eliminate an iridescent appearance.

An example of a color suppression layer includes a relatively thin layer of tin oxide on a substrate, such as the sheet of dielectric material 20, and a layer of silica on the tin oxide layer. Other color suppression layers known to those skilled in the art are well within the spirit and scope of the present invention.

Figure 5:
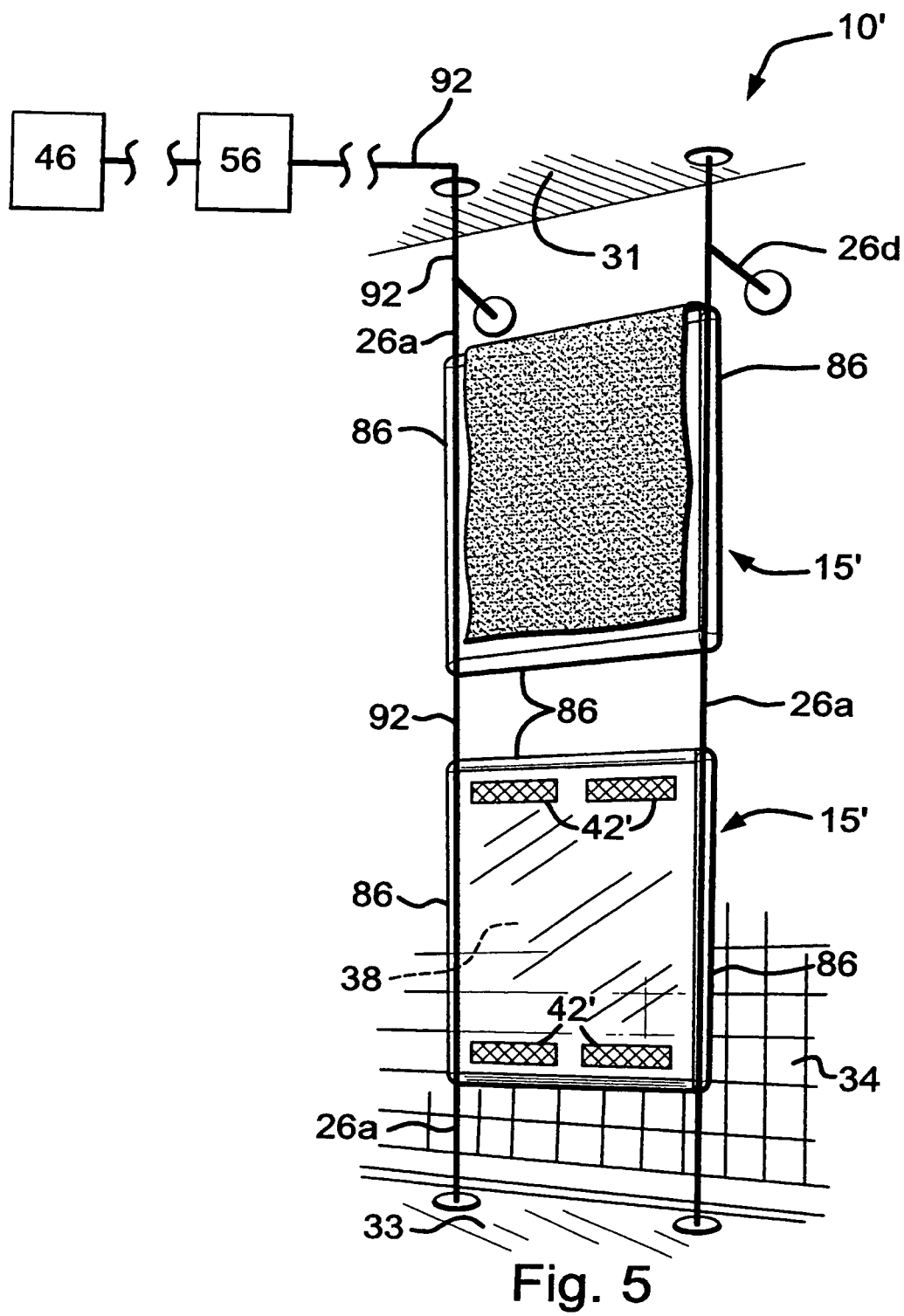
FIG. 5 depicts a three dimensional frontal view of a second alternative embodiment of the present invention.

In the preferred embodiment depicted in FIG. 3, at least two bus bars 42 (although only one bus bar 42 is shown) are in electrical contact with the conductive coating 38. Depending on the layout of the cloth heater 10, the bus bars 42 may be hidden by the covers 41, as shown in FIG. 1. However, in another layout of the cloth heater 10, and as shown in FIG. 5, the bus bars 42' may be disposed in different orientations (for example, horizontal or diagonal) or patterns (for example, varying widths and rounded) and it may not be necessary to hide the bus bars 42, 42', which could conceivably be at least a part of the designs.

Note that the pattern of the coating 38 and the placement of bus bars 42, 42' may define electrical circuits other than just the heating circuit required for the cloth heater 10, for example, actuators, sensors, and virtually any electrical component and/or circuit arrangement.

The bus bars 42, 42' comprise a conductor, or an assembly of conductors, for distributing an electric current to the conductive coating 38. An electrical power source 46, which may be high (e.g., +/−120 V and higher) or low voltage (e.g., +/−0 to 120 V) and that is alternating current (e.g., 50 Hz or 60 Hz AC), or direct current (DC), is preferably in electrical contact with the bus bars 42, 42', which are in electrical communication with the electrically conductive coating 38. The present invention, however, is not limited by the amplitude or frequency of the electrical power.

By way of an example and as depicted in the embodiment of FIG. 3, at least one metallic ring 44 (which may not be required) is operatively connected to the source of electric power 46. As shown, the ring 44 is connected to the electrical power source 46 with at least one electrical conductor 48 (which may be, for example, an electrical wire, lead, trace, or printed circuit track), by way of a connecting point 45, which may be, for example, an electrically conductive metallic tab 45 that is disposed on the bus bar 42 (see U.S. Patent Publication No. 2003-0127452).

However, the conductor 48 may be disposed externally to the support member 26, and plugged directly or indirectly into a source of power 46. On the other hand, the conductor 48 can be molded into the support member 26, or disposed on or within the support member 26, and then connected to a standard source of electrical power 46, by way of a controller 56.

In a particularly preferred embodiment and as FIG. 3 depicts, the conductor 48 is located within an interior tubular passage 50 of the support member 26. The conductor 48 extends through an aperture 52 located proximate to both a free end 54 of the support member 26 and the ring 44. The conductor 48 is electrically connected to the ring 44, possibly by the connecting point 45, which may include, by way of example, soldering or a force-fit male/female spade connection.

It should further be noted that the controller 56 may be disposed in the heated panel 15, for example, in the area of one of the covers 41, or within the support member 26. Notwithstanding the location of the controller 56, the controller 56 selectively provides electrical current/voltage to the electrically conductive coating 38 or other electrical circuits that may be disposed on, in, or near to the heated panel 15.

The controller 56 may be an electric switch that is turned on and off manually, or it may be a manually or automatically controlled rheostat, as known to those skilled in the art. Possibly, the controller 56 could be a "smart" computer controlled electronic device with programmable capabilities, wherein the controller 56 may process electrical and/or physical faults and failures in, on, or near to the cloth heater 10.

In a preferred embodiment of the present invention, the controller 56 would be capable of storing information associated with the heating history of the cloth heater 10, which may include, for example, the approximate temperature that the cloth heater 10 had reached before being shut down, the amount of time the cloth heater 10 had been turned on, and the amount of time that had passed since the cloth heater 10 was last turned off.

The controller 56 may regulate current flow or provide varying voltages to the conductive coating 38 that would correspond to a desired setpoint temperature for the panel 15. In so doing, the controller 56 may also utilize zero-voltage switching techniques where the power is only turned on when the power line voltage is at 0 VAC, thus preventing electromagnetic interference (EMI) and radio frequency interference (RFI).

The controller 56 may further be programmed to put the cloth heater 10 through a heat-maintain-cool (HMC) cycle. As an example, the HMC cycle may be set at two hours. During the heating mode portion of the HMC cycle, the controller 56 may apply full voltage for 100% of this portion of the HMC cycle, thus providing a 100% duty cycle and a fast heat-up (i.e., "burst" of heat) to the panel 15. Note that the controller 56 may be calibrated for each specific size cloth heater 10, so that the controller 56 knows how long to heat in order to reach the desired setpoint temperature (e.g., 140–160 degrees F.). The controller 56 may, however, separately or in combination with the specific size cloth heater calibration, utilize a sensor 47 (e.g., a temperature sensor for temperature or an optical sensor for the presence of a cloth) to determine the temperature of the panel 15.

After the cloth heater 10 has reached the desired setpoint temperature, the controller 56 would go into the maintaining mode portion of the HMC cycle, during which time the power is applied to the cloth heater 10 at a reduced duty cycle. This reduced duty cycle is calibrated so as to maintain the temperature of the cloth heater 10 at the desired setpoint temperature for the duration of the HMC cycle (e.g., two hours), thus providing electrical energy conservation.

Upon completion of the duration of the HMC cycle the controller 10 may switch to the cooling mode, at which time electrical power to the cloth heater 10 would automatically be turned off, thus causing the cloth heater 10 to cool.

With knowledge of the thermal characteristics of cloth heater 10, the controller 56 would be able, throughout each portion of the HMC cycle, to determine how much time had passed since heating, maintaining, or cooling and, therefore, be able to properly return the cloth heater 10 to the setpoint temperature without overheating the cloth heater 10.

In addition to or in place of the HMC cycle, the controller 56 may merely regulate the current/voltage for a desired period of time, at a desired time, to the desired setpoint temperature, and/or in the presence of the cloth 32 or in the absence of the cloth 32, which may vary across different portions of the cloth heater 10. By monitoring the flow of electrical current to the heated panel 15, the controller 56 is also capable of sensing if a broken heated panel 15 has resulted and, if so, the controller 56 will stop current flow immediately, in order to safely protect those individuals that may come in contact with the broken heat panel 15.

Although not wishing to be bound by any theory, it is believed that for the case of the heated glass cloth heater 10, the glass acts as a black body radiator. As a result, with no cloth 32 disposed thereon, the cloth heater 10 safely heats to a temperature below approximately 110 degrees F. However, in the presence of the cloth 32, the cloth heater 10 may attain a desired temperature of approximately 160 degrees F.

The controller 56 may also utilize predictive heating information that is associated with various factors, for example, the heating characteristics for the type of dielectric material being utilized and the environment (like the ambient temperature, relative humidity, and dew point temperature) in which the cloth heater 10 is being utilized. This information could allow, for example, defogging of a mirror (reflective) embodiment of the cloth heater 10.

Because of these and other factors, the controller 56 would be able to provide more or less electrical current to the cloth heater 10, so as to control the heat generated by the cloth heater 10, thereby providing the fastest, most efficient, and safest heating of the cloth heater 10. Other cloth heaters 10 would not be able to provide this kind of control, safety, and convenience to the user of the cloth heater 10.

It can be appreciated that, typically, dielectric material does not quickly acquire or dissipate heat. However, in this embodiment of the cloth heater 10, the controller 56 would provide less electrical current to the panel 15 when it had recently been heating, thus conserving electrical energy. Again, other cloth heaters do not provide these features.

In general, in the cloth heater 10 and, especially, in the areas 39 of the cap 41, there may be various electrical components and/or sensors 47 that perform various functions. They may, for example, provide electrical illumination, entertainment, messaging indication, sense motion, detect faults and failures. Examples of such faults and failures that may be detected, and subsequently be processed with or without the controller 56, are a break in the dielectric material sheet 20, 40, excessive electrical current being drawn by the cloth heater 10, or a ground fault that may have occurred in the cloth heater electrical circuit.

Consequently, the cloth heater 10, with or without the controller 56, may provide various functions, for example, be used as a night light, message LED (light emitting diode), text display, speakers, TV/radio/music player, clock, receive and send satellite signals, wireless reception and transmission, electrical outlets for AC/DC connections, on/off water or room lighting, hotel room cleaned signals, hotel room occupied signals, smoke, fire, and carbon monoxide sensing, provide lower and safer levels of voltage and current, or provide ground fault protection. The cloth heater 10 with the controller 56 may also sense improper heating conditions. As a result, the cloth heater 10/controller 56 may reduce the possibility of flooding, electrical shock, fire, or physical danger that other cloth heaters cannot provide. As a result, the controller 56 may, for example, stop current flow to the cloth heater 10, send an alarm signal 53 to a building security system (not shown), and/or sound an alarm 57 (see FIG. 3).

Although FIGS. 3 and 4 show the connecting point 45 as a single terminal point, the connecting point 45 can represent any or all of the above-mentioned electrical components and their respective electrical connections that can be electrically connected to the cloth heater 10 by way of multiple conductors 48.

The source of electric power 46 that is connected to the electronic controller 56 may be any source of electricity that provides voltage, amperage, and frequency as known to those skilled in the art, including those of countries outside of the United States. The present invention may provide the low voltage level mentioned above to the heated panel 15, so as to minimize the possibility of an electrical shock, fire, or burn hazard to those individuals that come in contact with the cloth heater 10, and yet provide effective and efficient heating of the cloth 32. However, by utilizing the controller 56 with higher voltages at or above 120 V, the present invention can safely monitor for potential hazards, while providing more rapid and convenient heating of the cloth heater 10.

In the preferred embodiment depicted in FIG. 3, at least one aperture 58 is located in the first sheet of dielectric material 20 and the free end 54 of the support member 26 is located within the aperture 58 to support the heated panel 15. When a plurality of support members 26 are to be used, an aperture 58 is located in the sheets 20, 40 to accommodate each of the support members 26.

Further, an electrically insulated securing device 68 is located on the free end 54 of the support member 26, adjacent to the heated panel 15, to removably secure the heated panel 15 to the support member 26. Preferably, the free end 54 of the support member 26 has an interlocking means, for example, a set of threads 62. The securing device 68, in turn, has a complementary interlocking means, for example, a complementary set of threads 64 that cooperate to engage the threads 62 on the support member 26.

Per this embodiment, it is preferred that the securing device 68 has an electrically insulating sleeve 66 to prevent transmittal of electricity from the bus bar 42, conductive coating 38, and/or the ring 44 to the securing device 68. The securing device 68 may be a decorative bushing having a brushed, polished, stained, and/or painted surface. Other means of securing the heated panel 15 to the support members 26, which would fall within the spirit and scope of the present invention, are, for example, adhesives or push pins that cause the panel 15 and the support member 26 to become attached.

Preferably, an electrically insulating material, for example the second sheet 40, is located over the bus bar 42 and the conductive coating 38. The material of the second sheet 40 may be any electrically insulating material known to those skilled in the art, which may be transparent, translucent, opaque, transmissive (as in an electronic display), or reflective (for example, a mirror). In a most preferred embodiment, the material 40 is transparent.

In another embodiment of FIG. 1, which is depicted in FIG. 4, the second sheet of dielectric material 40 is located adjacent to the first sheet of dielectric material 20 within the heated panel 15. By way of example, the second sheet of dielectric material 40 may be wood, plastic, stone, glass, ceramics, glass ceramics, or combinations thereof. As mentioned above, designs, patterns, or colorants may be located on or in the second sheet 40, or between the first sheet 20 and the second sheet 40.

These designs, patterns, or colorants may be the result of paint, enamel, sandblasting, carving, and/or etching that are disposed on or in both sheets 20, 40, and/or electrically or electronically generated by means that are known by those skilled in the art. Additionally, and/or alternatively, sheets of colored materials (not shown) can be located adjacent the second sheet 40.

The second sheet of dielectric material 40 has at least one aperture 70 for receiving the free end 54 of the support member 26 to support the second sheet 40. Preferably, an electrically insulated bushing 74 is fitted in the aperture 70 of the second sheet 40. The bushing 74 is located adjacent the ring 44 and prevents electricity from being translated to the support member 26.

The first sheet 20 and the second sheet 40 may or may not be in contact with one another. However, preferably, the sheets 20, 40 are in contact with one another through an adhesive material 76 located between them, thereby forming a laminated heated panel 15. Examples of adhesive material 76 include, but are not limited to, polyvinylbutyral, polyvinylchloride, or epoxy resins as known to those skilled in the art. In a most preferred embodiment, the adhesive material 76 is transparent. However, the adhesive materials 76, themselves, may contain pre-applied logos, designs, colorants, and colored and/or decorative materials.

Although not shown, the present invention also includes an insulated glass (IG) unit, wherein at least the first and second sheets 20, 40 are separated from one another by air or an inert gas, in place of the adhesive material 76, as known to those skilled in the art. As is also known by those skilled in the art of IG panels, a gasket is often used to keep the panels 20, 40 separated.

In the preferred embodiment depicted in FIG. 4, a coating stack comprising a doped metal oxide with a color suppression layer, commonly known as a reflective low-E film coating 78, is located at least partially on the surface 24 of the second sheet 40. In a most preferred embodiment, the reflective coating 78 is located on a rearward facing surface 80. The reflective coating 78 reflects heat, generated by electricity passing through the conductive coating 38 (described in more detail below), away from the wall 34.

In addition to dynamically controlling the heating of the cloth heater 10 with the controller 56, the present invention can control the amount of heat that passes to the cloth 32 by controlling the deposition of the reflective coating 78, which can reflect heat away from the cloth 32. For example, in the present invention a portion of the heat that could pass through the rear of the cloth heater 10 can be reflected away from the rear in order to prevent overheating of the wall 34 and the waste of the energy used. Other cloth heaters do not provide this kind of heating control.

It should be appreciated that the cloth heaters 10 of the present invention may be utilized to heat an area, for example, a bathroom, or used as a heated shower curtain, without requiring a cloth 32 to be disposed on the cloth heater 10.

The alternative embodiments of FIG. 5 will now be discussed. In each of these embodiments, it is to be understood that color suppression layers, low-E coatings, and/or dielectric materials comprising the sheets 20, 40, may be the same as those described above. Additionally, or alternatively, the electrically conductive coating 38 is preferably at least partially located on the dielectric material as described above. These panels will be designated with the reference number 15'.

These alternative embodiments of the present invention are depicted three dimensionally as a cloth heater 10' in FIG. 5, where the at least one vertically/diagonally disposed support member 26a/d are connected to at least one edge 86 of the panels 15'. The vertically disposed support member 26a may be, for example, a column, a wire, a chain, a wall corner, a pole, or combination thereof that is preferably connected to the wall 34, the ceiling 31, the floor 33, and/or the countertop/floor 33a. An electrical conducting means 92 is provided from the source of electric power 46 (as described above) on or within the vertically disposed support member 26a to the conductive coating 38.

One or more bus bars 42', or other conductive devices, can be used to connect the conductor(s)/wire(s) 92 to the conductive coating 38. As mentioned previously, the present invention is not limited by the orientation of the bus bars 42'. Although not required, preferably the controller 56, as described above, is electrically connected between the source of electric power 46 and the bus bars 42'. One or more panels 15' may be located above one another along the height of the vertically disposed member 26a.

Those skilled in the art will readily understand that the wire, chain, column, wall corner, pole, or combination thereof in any orientation, including horizontal, inclining, or declining, which is connected to at least one edge 86 of the panels 15', may also be used.

Referring to FIG. 6, there is depicted a front corner view of another embodiment of the present invention showing a portion of a heated panel 15 having a cover 41a and the first sheet of dielectric material 20. Further, FIG. 7 depicts a cut-away front corner view of the embodiment of FIG. 6 where the front of the cover 41*a* is not shown, so as to expose the structure, wires, electrical connections, physical connections, and components therebehind.

As mentioned above, the cover 41*a* may comprise various electrical components and sensors 47 that illuminate the cover 41*a* or are kept out of sight by the cover 41*a*. However, it is within the spirit and scope of the present invention that such components and sensors 47 may be positioned elsewhere in, around, or near to the cloth heater 10.

Shown in FIG. 7 is the first sheet 20, which is in front of the second sheet 40, wherein the heated panel 15 is comprised as discussed above for FIGS. 1–5. It is also conceivable that the relationship of the first sheet 20 to the second sheet 40 may be reversed in the present invention. The relationship of the sheets 20, 40 notwithstanding, the sheets 20, 40 are attached by means common in the art to a cover edge 43. The attachment means may be, for example, by a force-fit or a snap-fit of the first sheet 20 and/or the second sheet 40 to the cover edge 43 or adhesives.

As an example and as shown in FIG. 7, the first sheet 20 is attached to the second sheet 40 by the means discussed above (see, for example, the discussion regarding FIGS. 3 and 4), while at least one corner of each sheet 20, 40 is not formed to a corner of the cover edge 43. Although not required, but as FIG. 7 shows, the corner of one of the sheets 20, 40 is formed at a different angle to the corner of the other sheet 40, 20, thus exposing a bus bar portion 42*a*. Note that the bus bar 42 is disposed on the coating 38 (not visible) that in turn is disposed on the first sheet 20, as also discussed above with regard to FIGS. 3 and 4.

Further, FIG. 7 illustrates an end-on view of the support member 26*a* having the interior tubular passage 50, where the at least one conductor 48 (not shown) can be disposed. Consequently, the conductor 48 may be electrically connected, by means that are common in the art, on one end to at least the exposed bus bar portion 42*a*, thus electrically connecting the conductor 48 to the coating 38.

As an alternative, a metallic tab (not shown) may be electrically connected to the bus bar 42 for electrical connection of the conductor 48 to the bus bar 42, which may not require the exposing of the bus bar portion 42*a*, as discussed above. Also shown are mounting means 61, for example, adhesives, screws, plastic molding of the support member 26 to the cover 41*a*, and/or rivets, which provide the attachment of the cover edge 43 to the support member 26.

Referring now to FIG. 8, there is shown a top view of the embodiment of FIG. 6 where the support member 26*a* is attached to the wall 34, and the heated panel 15 is attached to the support member 26*a*, via the electrically insulated securing device 68*a*.

As described above, the present invention is quite simple in design and, therefore, it is simple to use. The cloth heaters 10 require a negligible amount of floor/countertop/wall space, while directly heating the cloth on the at least two surfaces, thus maximizing the heating and the heat efficiency. The use of the "smart" controller 56 can provide special control features that other cloth heaters do not possess, for example, heating history of the panel and quickly getting the cloth temperature to a comfortable level. The use of electrical components/sensors 47, and the controller 56 assures selectable control of the heating conditions by providing control and monitoring of dangerous conditions, control of the heat that is directed to the rear of the cloth heater 10, and possible low voltage operation. In the present invention, no enclosure, no liquid, no fan, nor a pump are required, as other cloth heaters do require. The wiring can be hidden out of sight, while the use of designs and internal layers provide aesthetically pleasing appearances.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. An electrically heated glass panel cloth heater, comprising:
   a first glass sheet having first and second major surfaces, the second major surface of the first glass sheet having an electrically conductive coating disposed thereon and at least two conductive bus bars disposed on the electrically conductive coating;
   a second sheet of a dielectric material having first and second major surfaces, the first major surface of the first glass sheet and the second major surface of the second sheet being in an opposing relationship to each other, the second major surface of the first glass sheet being laminated to the first major surface of the second sheet by way of a polymeric interlayer therebetween, thus forming a laminated heated glass panel;
   at least one support member, the support member being secured to the heated glass panel and supporting the panel on a wall, floor, countertop, ceiling, and/or other building member; and
   at least two conductors disposed within, on, or near to the support member, each conductor being electrically connected on one end to a separate bus bar and each conductor being electrically connected on another end to a source of electrical power;
   wherein, when electricity is communicated through the conductors and the bus bars to the electrically conductive coating, heat is generated at the first glass sheet's first major surface and at the second sheet's second major surface, and, subsequently, when a cloth is placed over a horizontally disposed surface, a portion of the cloth is proximate the first glass sheet's first major surface and another portion of the cloth is proximate the second sheet's second major surface, thus heating the cloth.

2. The cloth heater of claim 1, wherein the heated panel comprises plastic, ceramics, or glass-ceramics.

3. The cloth heater of claim 1, wherein the heated panel comprises optically clear, tempered, soda-lime-silica glass.

4. The cloth heater of claim 1, further comprising a thin film coating, comprised of a conductive metal oxide.

5. The cloth heater of claim 4, wherein at least a portion of the peripheral edge of the heated panel is devoid of the thin film coating.

6. The cloth heater of claim 4, wherein the conductive metal oxide coating comprises tin oxide.

7. The cloth heater of claim 6, wherein the conductive metal oxide coating further comprises oxides of fluorine, indium, or antimony.

8. The cloth heater of claim 7, wherein the conductive coating comprises layers of a first dielectric material, a metal, and a second dielectric material.

9. The cloth heater of claim 8, wherein the first and second dielectric materials comprise zinc oxide and the metal comprises silver.

10. The cloth heater of claim 1, further comprising a color suppression layer disposed on or within the heated glass panel.

11. The cloth heater of claim 10, wherein the color suppression layer comprises a thin layer of tin oxide having a layer of silica disposed thereon.

12. The electrically heated glass panel cloth heater of claim 1, further comprising a controller that is in electrical communications between the electrical conductors and the source of electrical power, the controller comprising an electrical switch, rheostat, or programmable computer controller.

13. The electrically heated glass panel cloth heater of claim 12, wherein the programmable computer controller is capable of detecting a fault condition from within the heated glass panel cloth heater, causing the programmable computer controller to stop providing current to the cloth heater, to sound an alarm, and/or to send an error signal to a building security system.

14. The electrically heated glass panel cloth heater of claim 12, wherein the programmable computer controller is capable of stopping a flow of electrical current to the heated glass panel cloth heater upon detection of a broken heated glass panel, a detection of a ground fault condition, or both.

15. The electrically heated glass panel cloth heater of claim 12, wherein the programmable computer controller utilizes zero-crossing switching techniques to supply electrical current to the heated glass panel.

16. The electrically heated glass panel cloth heater of claim 12, wherein the programmable computer controller utilizes a heating-maintaining-cooling cycle.

17. The electrically heated glass panel cloth heater of claim 16, wherein the heating-maintaining-cooling cycle comprises a heating mode portion whereby the programmable computer controller applies full line voltage to the electrically heated glass panel cloth heater until the heated glass panel reaches a desired setpoint temperature.

18. The electrically heated glass panel cloth heater of claim 17, wherein the heating-maintaining-cooling cycle further comprises a maintaining mode portion whereby the programmable computer controller applies a portion of the full line voltage to the electrically heated glass panel cloth heater to maintain the desired setpoint temperature.

19. The electrically heated glass panel cloth heater of claim 18, wherein the heating-maintaining-cooling cycle further comprises a cooling mode portion where the programmable computer controller stops applying line voltage to the electrically heated glass panel cloth heater so as to allow the electrically heated glass panel cloth heater to cool.

20. The electrically heated glass panel cloth heater of claim 17, wherein the programmable computer controller is calibrated for a specific size of heated glass panel cloth heater, thereby causing the programmable computer controller to supply voltage to the heated glass panel cloth heater for a time sufficient to reach a desired setpoint temperature in the range of 140–160 degrees F.

21. The electrically heated glass panel cloth heater of claim 12, wherein the programmable computer controller utilizes heated glass panel predictive and/or historic heating information to control the heating of the heated glass panel.

22. The electrically heated glass panel cloth heater of claim 1, further comprising a reflective color suppressed low-E film stack disposed therein or thereon.

23. The electrically heated glass panel cloth heater of claim 22, wherein the heat being transmitted through the major opposing surfaces is controlled by the low-E color suppression layer and/or the programmable computer controller.

24. The electrically heated glass panel cloth heater of claim 1, wherein the heated glass panel utilizes a voltage in the range of −100 to +100 volts alternating current or direct current.

25. The electrically heated glass panel cloth heater of claim 1, wherein the heated panel utilizes a voltage of approximately 120 volts alternating current.

26. The electrically heated glass panel cloth heater of claim 1, wherein the heated glass panel cloth heater is permanently attached to, removably attached to, or movably disposed on a ceiling, a floor, a wall, or a countertop.

27. The electrically heated glass panel cloth heater of claim 1, wherein the electrically heated glass panel cloth heater is transparent, translucent, opaque, or reflective.

28. The electrically heated glass panel cloth heater of claim 1, further comprising designs disposed thereon and/or therein.

29. The electrically heated glass panel cloth heater of claim 1, wherein the polymeric interlayer comprises polyvinylbutyral, polyvinylchloride, or epoxy resins.

30. The electrically heated glass panel cloth heater of claim 1, wherein the support member is capable of pivotal motion to allow the heated panel to tilt away from or toward the wall, floor, countertop, ceiling, and/or other building member.

31. The electrically heated glass panel cloth heater of claim 1, wherein the support member is capable of allowing the heated glass panel to move inline toward or away from the wall, floor, countertop, ceiling, and/or other building member.

32. The electrically heated glass panel cloth heater of claim 1, wherein the support member is capable of tilting the heated panel from one side to the other side.

33. The electrically heated glass panel cloth heater of claim 1, wherein the support member is capable of allowing the heated glass panel to move in the direction of the horizontally disposed surface or in the direction opposite of the horizontally disposed surface.

34. The electrically heated glass panel cloth heater of claim 1, further comprising at least one cover, wherein the cover is disposed on at least the first major surface of the first glass sheet for visually hiding the electrical conductors, electrical connections, physical connections, and components.

35. The electrically heated glass panel cloth heater of claim 1, wherein the horizontally disposed surface is a top edge or surface of the heated glass panel.

36. The electrically heated glass panel cloth heater of claim 1, further comprising a rack that includes the horizontally disposed surface.

37. The electrically heated glass panel cloth heater of claim 36, wherein the rack is capable of vertically aligning the cloth with the heated glass panel opposing major surfaces.

38. The electrically heated glass panel cloth heater of claim 36, wherein the rack is separate from the heated glass panel.

39. The electrically heated glass panel cloth heater of claim 36, wherein the rack is attached to the heated glass panel and/or the support member.

40. A method for heating a cloth with an electrically conductive heated glass panel cloth heater, comprising:
utilizing a first glass sheet having first and second major surfaces, the second major surface of the first glass sheet having an electrically conductive coating disposed thereon and two conductive bus bars being disposed on the electrically conductive coating;

utilizing a second sheet of a dielectric material having first and second major surfaces, the first major surface of the first glass sheet and the second major surface of the second sheet being in an opposing relationship to each other, the first major surface of the second sheet being laminated with a polymeric interlayer to the second major surface of the first glass sheet, thus forming a laminated heated glass panel;

utilizing at least one support member, the support member being secured to the heated glass panel and supporting the panel on a wall, countertop, floor, ceiling, or other building member, thus physically supporting the laminated heated glass panel, and the support member having electrical conductors that communicate electrical power to the laminated heated glass panel, thus heating the heated glass panel; and placing a cloth across a horizontally disposed surface, wherein the horizontally disposed surface supports the cloth, and the cloth is proximate the two opposing major surfaces, thus heating the cloth at both opposing major surfaces.

* * * * *